(12) United States Patent
Schoner

(10) Patent No.: US 8,254,462 B2
(45) Date of Patent: Aug. 28, 2012

(54) METHOD AND SYSTEM FOR BLOCK NOISE REDUCTION

(75) Inventor: Brian Schoner, Freemont, CA (US)

(73) Assignee: Broadcom Corporation, Irvine, CA (US)

( * ) Notice: Subject to any disclaimer, the term of this patent is extended or adjusted under 35 U.S.C. 154(b) by 1703 days.

(21) Appl. No.: 11/090,642

(22) Filed: Mar. 25, 2005

(65) Prior Publication Data

US 2006/0171467 A1 Aug. 3, 2006

Related U.S. Application Data

(60) Provisional application No. 60/648,302, filed on Jan. 28, 2005.

(51) Int. Cl.
*H04B 1/66* (2006.01)
*H04N 7/12* (2006.01)
(52) U.S. Cl. .................................. 375/240.24; 348/448
(58) Field of Classification Search ............. 375/240.24
See application file for complete search history.

(56) References Cited

U.S. PATENT DOCUMENTS

| | | | |
|---|---|---|---|
| 5,590,064 A | 12/1996 | Astle | |
| 5,828,467 A * | 10/1998 | Suzuki | 382/268 |
| 5,959,693 A | 9/1999 | Wu et al. | |
| 6,504,873 B1 | 1/2003 | Vehvilainen | |
| 6,804,294 B1 | 10/2004 | Hartung et al. | |
| 6,973,221 B1 | 12/2005 | Xue | |
| 6,983,079 B2 | 1/2006 | Kim | |
| 7,003,173 B2 * | 2/2006 | Deshpande | 382/261 |
| 7,003,174 B2 | 2/2006 | Kryukov et al. | |
| 7,031,546 B2 | 4/2006 | Maeda et al. | |
| 7,075,580 B2 * | 7/2006 | Jiang | 348/448 |
| 7,245,326 B2 * | 7/2007 | Orlick | 348/448 |
| 7,346,226 B2 | 3/2008 | Shyshkin | |
| 7,379,626 B2 | 5/2008 | Lachine et al. | |
| 7,412,109 B2 * | 8/2008 | Kong et al. | 382/261 |
| 7,437,013 B2 | 10/2008 | Anderson | |
| 7,616,829 B1 | 11/2009 | Bilbrey et al. | |
| 7,738,722 B2 * | 6/2010 | Gomila et al. | 382/254 |
| 7,848,408 B2 | 12/2010 | Feng | |
| 2003/0098925 A1 * | 5/2003 | Orlick | 348/448 |
| 2006/0171458 A1 | 8/2006 | Feng | |
| 2006/0171466 A1 | 8/2006 | Schoner | |
| 2006/0171473 A1 | 8/2006 | Schoner | |

OTHER PUBLICATIONS

International Organization for Standardization, ISO/IEC JTC 1/SC 29/WG 11, Coding of Moving Pictures and Audio, "Information Technology-Coding of Audio-Visual Objects—Part 2: Visual, Amendment 1: Visual Extensions, Annex F—Preprocessing and Postprocessing", Maui, Hawaii, USA, Dec. 1999.

* cited by examiner

*Primary Examiner* — Joseph Ustaris
*Assistant Examiner* — Anner Holder
(74) *Attorney, Agent, or Firm* — Thomas, Kayden, Horstemeyer & Risley, LLP

(57) ABSTRACT

In a video system, a method and system for block noise reduction are provided. Edge parameters based on spatial variance may be determined to detect vertical edges that may result from block noise. These edge parameters may be determined serially. Once detected, pixels neighboring the vertical edges may be filtered and clamped to determine a vertical block noise reduction difference (BNR) parameter. Similarly, edge parameters based on spatial variance may be determined to detect horizontal edges that may result from block noise. These edge parameters may be determined serially. Once detected, pixels neighboring the horizontal edge may be filtered and clamped to determine a horizontal BNR difference parameter. The vertical and horizontal BNR difference parameters may be utilized to reduce block noise artifacts in the video image.

28 Claims, 14 Drawing Sheets

METHOD AND SYSTEM FOR BLOCK NOISE REDUCTION

CROSS-REFERENCE TO RELATED APPLICATIONS/INCORPORATION BY REFERENCE

This patent application makes reference to, claims priority to and claims benefit from U.S. Provisional Patent Application Ser. No. 60/648,302, filed on Jan. 28, 2005.

This application makes reference to:
U.S. patent application Ser. No. 11/087,491 filed Mar. 22, 2005;
U.S. patent application Ser. No. 11/083,597 filed Mar. 18, 2005; and
U.S. patent application Ser. No. 11/089,788 filed Mar. 25, 2005.

The above stated applications are hereby incorporated herein by reference in their entirety.

FIELD OF THE INVENTION

Certain embodiments of the invention relate to video processing. More specifically, certain embodiments of the invention relate to a method and system for block noise reduction.

BACKGROUND OF THE INVENTION

Advances in compression techniques for audio-visual information have resulted in cost effective and widespread recording, storage, and/or transfer of movies, video, and/or music content over a wide range of media. The Moving Picture Experts Group (MPEG) family of standards is among the most commonly used digital compressed formats. A major advantage of MPEG compared to other video and audio coding formats is that MPEG-generated files tend to be much smaller for the same quality. This is because MPEG uses very sophisticated compression techniques. However, MPEG compression may be lossy and, in some instances, it may distort the video content. In this regard, the more the video is compressed, that is, the higher the compression ratio, the less the reconstructed video resembles the original information. Some examples of MPEG video distortion are a loss of texture, detail, and/or edges. MPEG compression may also result in ringing on sharper edges and/or discontinuities on block edges. Because MPEG compression techniques are based on defining blocks of video image samples for processing, MPEG compression may also result in visible "macroblocking" that may result due to bit errors. In MPEG, a macroblock is the area covered by a 16×16 array of luma samples in a video image. Luma may refer to a component of the video image that represents brightness. Moreover, noise due to quantization operations, as well as aliasing and/or temporal effects may all result from the use of MPEG compression operations.

When MPEG video compression results in loss of detail in the video image it is said to "blur" the video image. In this regard, operations that are utilized to reduce compression-based blur are generally called image enhancement operations. When MPEG video compression results in added distortion on the video image it is said to produce "artifacts" on the video image. For example, the term "block noise" may refer to MPEG artifacts that may be caused by the quantization of low spatial frequency information in the image. Block noise may appear as edges on 8×8 blocks and may give the appearance of a mosaic or tiling pattern on the video image.

Some of the characteristics of block noise may result from the fact that it is an artifact of the 8×8 block Discrete Cosine Transform (DCT) operation in MPEG compression. Block noise may generally result from the quantization of low-frequency spatial information. Block noise may generally occur near a block boundary. While block noise may occur anywhere on an image, it is more commonly seen in nearly smooth regions, such as the sky and faces, or in high motion or high variance regions, such as moving water. Block noise may be more common, and generally more severe, at low bit rates. For example, block noise may be more severe when macroblocks are coded with a higher quantization scale and/ or on a larger quantization matrix. While block noise is typically caused by quantization of low spatial frequency terms that result from the DCT operation, it is not generally caused by the quantization of the DC term. For example, MPEG compression generally provides at least 8 bits when quantizing the DC term of intra coded blocks.

Block noise may also appear at discontinuities located at or near the block edges. The block boundaries may remain fixed even when the video image moves. In this regard, a static block pattern may stand out strongly against a moving background, a condition that may be highly objectionable from a viewer's perspective. In some instances, however, motion vectors generated during MPEG compression may cause block noise to move with the video image, but this is generally less common and less objectionable from a viewer's perspective. Block noise may be more objectionable on vertical edges than on horizontal edges, particularly on an interlaced display.

Block noise may generally be more pronounced in certain picture coding types. For example, block noise may be often worse in intra coded pictures or I-pictures and in predicted pictures or P-pictures. While block noise is generally associated with the brightness component or luma of a video image, it may also occur in the color components or chroma of a video image. However, block noise in the chroma component may generally be less of a problem since it is less objectionable to a viewer of the decompressed video image.

There have been attempts to provide normative approaches for reducing the effects of block noise. For example, the MPEG4 specification ISO/IEC 14496-2:1999/Amd.1:2000 (E) Annex F comprises a state-of-the-art block noise filter, which is also called a deblocking filter. This deblocking filter may have several limitations. For example, the block noise detection algorithm utilized by the deblocking filter is based only on a few neighboring pixels and, as a result, may frequently filter real content erroneously. Horizontal edges may be filtered utilizing a similar approach as with vertical edges, making this method inappropriate for interlaced video and resulting in artifacts caused by the filtering process. Moreover, horizontal edge filtering may require 10 vertically adjacent pixels, for example. For raster-scanned video this may require 9 line stores, which may make the implementation very expensive. Future solutions to the presence of these types of video compression artifacts may need to provide cost effective and easy to implement reductions in block noise without any perceptible degradation in video quality.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for block noise reduction, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for block noise reduction. Edge parameters based on spatial variance may be determined to detect vertical edges that may result from block noise. These edge parameters may be determined serially. Once detected, pixels neighboring the vertical edges may be filtered and clamped to determine a vertical block noise reduction difference (BNR) parameter. Similarly, edge parameters based on spatial variance may be determined to detect horizontal edges that may result from block noise. These edge parameters may be determined serially. Once detected, pixels neighboring the horizontal edge may be filtered and clamped to determine a horizontal BNR difference parameter. The vertical and horizontal BNR difference parameters may be utilized to reduce block noise artifacts in the video image. Note that the following discussion will generally use the terms "image" and "picture" interchangeably. Accordingly, notions of difference between the terms "image" and "picture" should not limit the scope of various aspects of the present invention.

Figure 1:
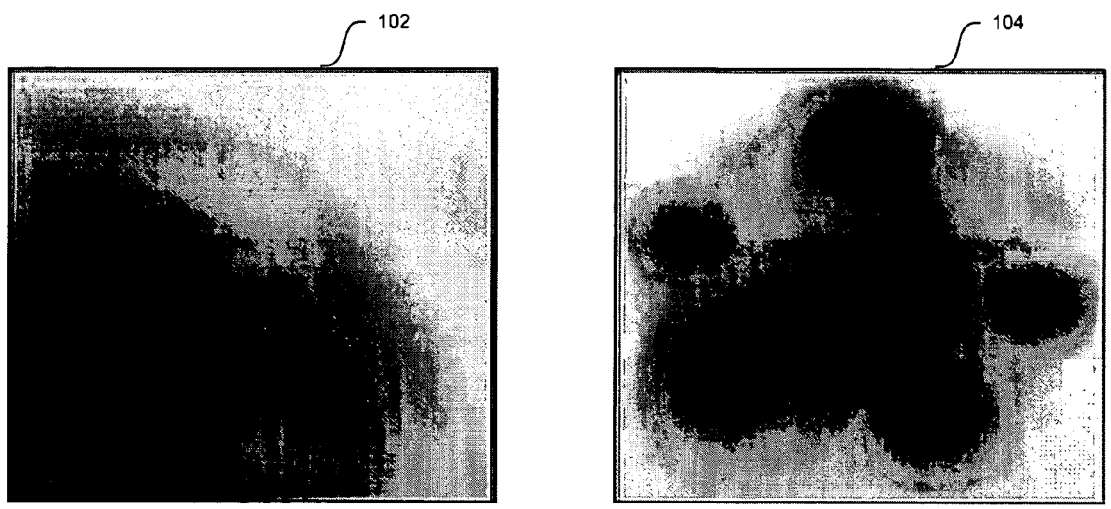
FIG. 1 illustrates various aspects of block noise in video systems that may be utilized in accordance with an embodiment of the invention.

FIG. 1 illustrates various aspects of block noise in video systems that may be utilized in accordance with an embodiment of the invention. Referring to FIG. 1, there is shown a first image 102 and a second image 104 which illustrate visual artifacts that result from block noise in nearly smooth regions of the image. Other aspects of the video content and processing, for example, coding type, bit rate, video motion, may also contribute to the presence of block noise in the first image 102 and in the second image 104.

Because block noise may be related to the MPEG block structure, several factors, including field or frame coding of macroblocks, chroma coding format, for example, 4:4:4/4:2:2/4:2:0, and field or frame raster scan from a feeder may need to be considered for an effective noise reduction implementation. For example, in MPEG2 main profile and in MPEG2 simple profile, chroma may be coded as 4:2:0 and may generally have block noise on 16×16 image blocks or macroblocks. The original video content may be coded into macroblocks as field data or as frame data. The original video may be coded as frame pictures by utilizing a field or frame DCT coding. When the frame DCT coding is utilized, an 8×8 luma block may comprise 4 lines from each field. When the field DCT coding is utilized, an 8×8 luma block may comprise 8 lines from a single field. The original video may also be coded as field pictures in which case an 8×8 luma block may comprise 8 lines from a single field.

Figure 2:
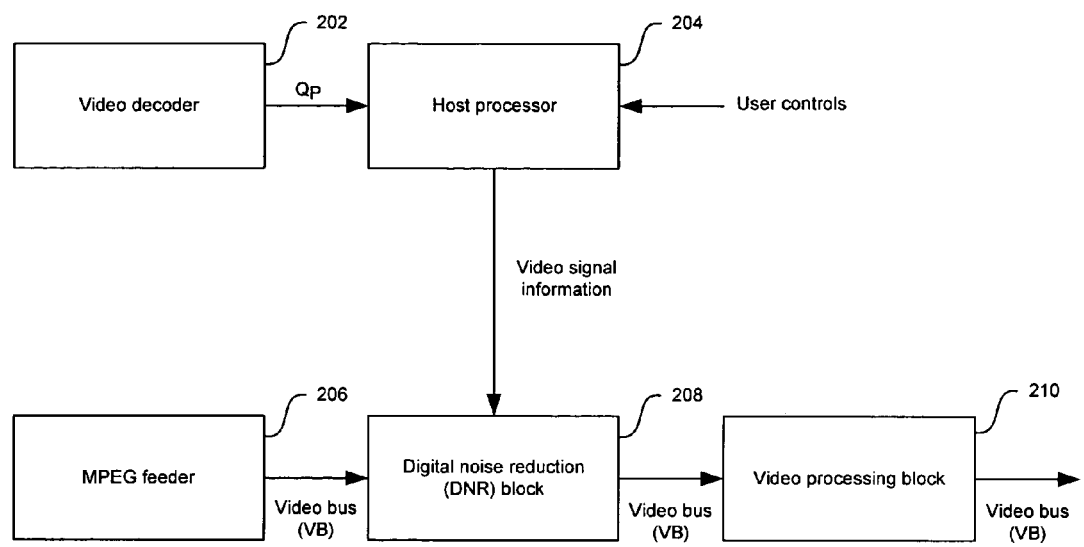
FIG. 2 is a block diagram of an exemplary video processing system that may be utilized for mosquito noise reduction (MNR) and/or block noise reduction (BNR), in accordance with an embodiment of the invention.

FIG. 2 is a block diagram of an exemplary video processing system that may be utilized for mosquito noise reduction (MNR) and/or block noise reduction (BNR), in accordance with an embodiment of the invention. Referring to FIG. 2, there is shown a video processing system 200 comprising a video decoder 202, a processor 204, an MPEG feeder 206, a digital noise reduction (DNR) block 208, and a video processing block 210. The video decoder 202 may comprise suitable logic, circuitry, and/or code that may be adapted to decode compressed video information. The host processor 204 may comprise suitable logic, circuitry, and/or code that may be adapted to process quantization information, Qp, received from the video decoder 202 and/or user control information received from at least one additional device or processing block. The host processor 204 may be adapted to generate video signal information that corresponds to a current picture based on the processed quantization information and/or user control information. The generated video signal information may comprise, for example, threshold settings, indications of whether a video field is a top field or a bottom field, indications of whether the video signal is interlaced or progressive, and/or the size of the video image. The host processor 204 may transfer the video signal information to the DNR block 208. In some instances, at least a portion of the video signal information may be received by the DNR block 208 via a register direct memory access (DMA).

The MPEG feeder 206 may comprise suitable logic, circuitry, and/or code that may be adapted to transfer a plurality of MPEG-coded images to the DNR block 208 via a video bus (VB), for example. In this regard, the VB may utilize a specified format for transferring images from one processing or storage block to another processing or storage block. The DNR block 208 may comprise suitable logic, circuitry, and/or code that may be adapted to reduce some artifacts that may result from MPEG coding. In this regard, the DNR block 208 may be adapted to process MPEG-coded images to reduce mosquito noise. The processing performed by the DNR block 208 may be based on the contents of a current video image and on the video signal information corresponding to that current video image transferred from the host processor 204. The video signal information may be programmed or stored into registers in the DNR block 208 during the vertical blanking interval, for example. This programming approach may reduce any unpredictable behavior in the DNR block 208. The DNR block 208 may be adapted transfer the processed MPEG-coded images to the video processing block 210 via the VB. The video processing block 210 may comprise suitable logic, circuitry, and/or code that may be adapted to perform various image processing operations such as scaling and/or deinterlacing, for example, on the processed MPEG-coded images received from the DNR block 208.

When the pictures from the MPEG feeder 206 are coded as field pictures they may be transferred to the DNR block 208 as field pictures. When the pictures from the MPEG feeder 206 are coded as frame pictures they may be transferred to the DNR block 208 as frame or field pictures in accordance with the video stream format and/or the display. In this regard, frame pictures that are transferred to the DNR block 208 as field pictures may have mosquito noise on 4 vertical line boundaries.

The DNR block 208 may also be adapted to provide post-processing operations for the Advanced Video Codec (AVC) and/or the Windows Media (VC9) codec. The deblocking or artifact reduction operations performed by the DNR block 208 may be relaxed for AVC and VC9 because they specify in-loop deblocking filters. For example, AVC transforms may exhibit less ringing that the 8×8 DCT utilized in MPEG. Moreover, while AVC and VC9 allow image block sizes smaller than 8×8 to be utilized, processing at the sub-block level may present some difficulties and the DNR block 208 may perform deblocking filtering for AVC and VC9 without sub-block processing.

Figure 3:
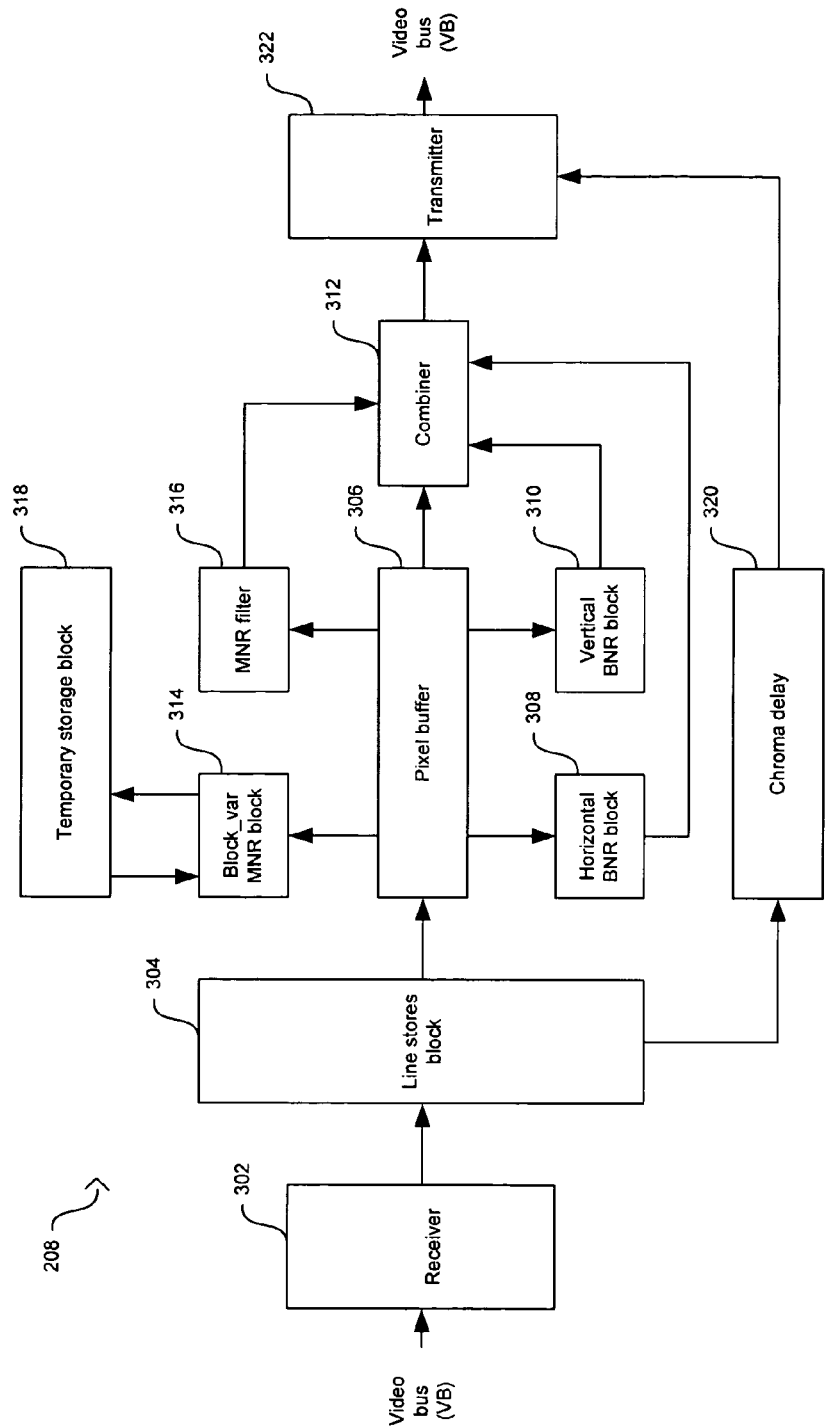
FIG. 3 is a block diagram of an exemplary top-level partitioning of the DNR, in accordance with an embodiment of the invention.

FIG. 3 is a block diagram of an exemplary top-level partitioning of the DNR, in accordance with an embodiment of the invention. Referring to FIG. 3, the DNR block 208 described in FIG. 2 may comprise a VB receiver (VB RCV) 302, a line stores block 304, a pixel buffer 306, a combiner 312, a horizontal block noise reduction (HBNR) block 308, a vertical block noise reduction (VBNR) block 310, a chroma delay block 720, and a VB transmitter (VB XMT) 322. In some instances, the DNR block 208 may also support mosquito noise reduction and may comprise a block variance mosquito noise reduction (BV MNR) block 314, an MNR filter 316, and a temporary storage block 318 for that purpose.

The VB RCV 302 may comprise suitable logic, circuitry, and/or code that may be adapted to receive MPEG-coded images in a format that is in accordance with the bus protocol supported by the VB. The VB RCV 302 may also be adapted to convert the received MPEG-coded video images into a different format for transfer to the line stores block 304. The line stores block 304 may comprise suitable logic, circuitry, and/or code that may be adapted to convert raster-scanned luma data from a current MPEG-coded video image into parallel lines of luma data. The line stores block 304 may be adapted to operate in a high definition (HD) mode or in a standard definition (SD) mode. Moreover, the line stores block 304 may also be adapted to convert and delay-match the raster-scanned chroma information into a single parallel line.

The pixel buffer 306 may comprise suitable logic, circuitry, and/or code that may be adapted to store luma information corresponding to a plurality of pixels from the parallel lines of luma data generated by the line stores block 304. For example, the pixel buffer 306 may be implemented as a shift register. When the DNR block 208 is also adapted to support mosquito noise reduction, the pixel buffer 306 may be common to the MNR block 314, the MNR filter 316, the HBNR block 308, and the VBNR block 310 to save floating point operations per second (flops). The HBNR block 308 may comprise suitable logic, circuitry, and/or code that may be adapted to determine a horizontal block noise reduction difference parameter for a current horizontal edge. The VBNR block 310 may comprise suitable logic, circuitry, and/or code that may be adapted to determine a vertical block noise reduction difference parameter for a current vertical edge.

The combiner 312 may comprise suitable logic, circuitry, and/or code that may be adapted to combine the original luma value of an image block pixel from the pixel buffer 306 with luma values that result from the operations performed by the HBNR block 308 and the VBNR block 310. The chroma delay 320 may comprise suitable logic, circuitry, and/or code that may be adapted to delay the transfer of chroma pixel information in the chroma data line to the VB XMT 322 to substantially match the time at which the luma data generated by the combiner 312 is transferred to the VB XMT 322. The VB XMT 322 may comprise suitable logic, circuitry, and/or code that may be adapted to assemble noise-reduced MPEG-coded video images into a format that is in accordance with the bus protocol supported by the VB.

Figure 4A:
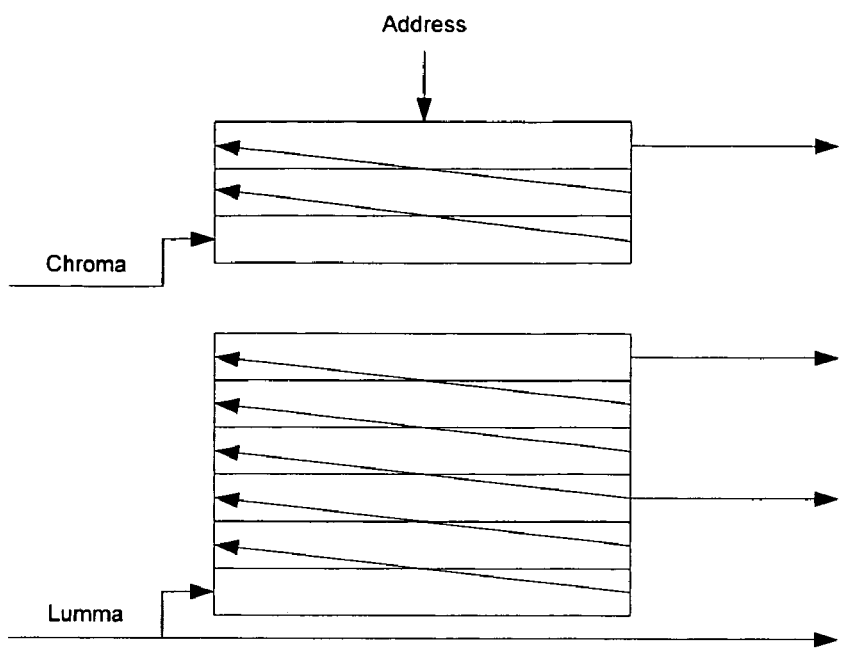
FIG. 4A illustrates an exemplary operation of line stores in a high definition (HD) mode, in accordance with an embodiment of the invention.

FIG. 4A illustrates an exemplary operation in a high definition (HD) mode, in accordance with an embodiment of the invention. Referring to FIG. 4A, the line stores block 304, described in FIG. 3, may be adapted to operate in a mode that converts HD image sources into output parallel lines. In this regard, the line stores block 304 may be adapted to generate three output parallel luma lines and one output chroma line, for example. The line stores block 304 may need to know the raster position relative to the image block boundaries. For example, the host processor 204 or a register DMA may provide offset values when a first raster pixel does not correspond to an image block boundary.

In one embodiment of the invention, the line stores block 304 may be implemented as a 768×72 memory with a single address. Both luma and chroma data may be wrapped from the output to the input as shown in FIG. 4A. In this regard, the luma data is expanded into three parallel lines and the chroma data is delay-matched by one line. For example, for a 1920× 1080i HD video signal, where i refers to interlaced video, the address may count modulo 640 and the data values may wrap around three times, or 3×640=1920. In another example, for a 1280×720p HD video signal, where p refers to progressive video, the address may count modulo 426 and the data values may wrap around three times, or 3×426=1278, with an error of two pixels. In this regard, additional registers and/or storage elements may be utilized for each line out to compensate for the error. The line stores block 304 may be adapted to process all picture sizes up to, for example, 1920 pixels width.

Figure 4B:
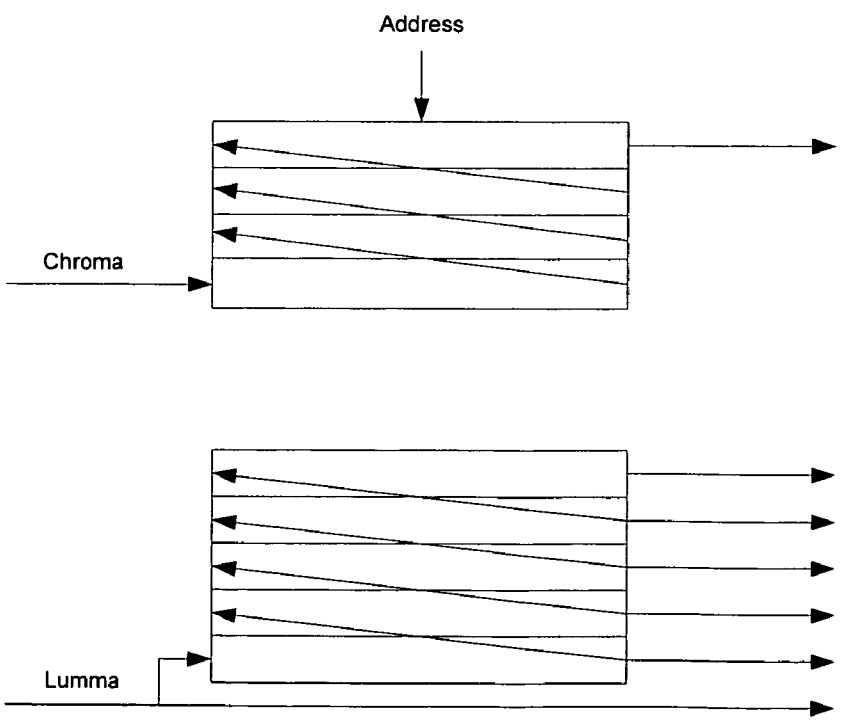
FIG. 4B illustrates an exemplary operation of line stores in a standard definition (SD) mode, in accordance with an embodiment of the invention.

FIG. 4B illustrates an exemplary operation in a standard definition (SD) mode, in accordance with an embodiment of the invention. Referring to FIG. 4B, the line stores block 304 described in FIG. 3 may be adapted to operate in a mode that converts SD image sources into output parallel lines. In this regard, the line stores block 304 may be adapted to generate six output parallel luma lines and one output chroma line, for example. The line stores block 304 may need to know the raster position relative to the image block boundaries. For example, the host processor 204 or a register DMA may provide offset values when a first raster pixel does not correspond to an image block boundary.

In one embodiment of the invention, the line stores block 304 may be implemented as a 768×72 memory with a single address. Both luma and chroma data may be wrapped from the output to the input as shown in FIG. 4B. In this regard, the luma data is expanded into six parallel lines and the chroma data is delay-matched by four lines. For example, for a 704× 480i SD video signal, where i refers to interlaced video, the address may count modulo 720 and the data values may not need to wrap around and produce an error of 16 pixels. In this regard, additional registers and/or storage elements may be utilized for each line out to compensate for the error. The line stores block 304 may be adapted to process all picture sizes up to, for example, 1920 pixels width.

The line stores block 304, whether operating in an HD mode or an SD mode, may also be adapted to provide line information, image block information, and/or pixel location information to the pixel buffer 306 and/or the chroma delay 320. For example, the line stores block 304 may indicate the position, location, and/or coordinates of a pixel in an 8×8 image block. The position, location, and/or coordinates may be adjusted based on any offset values. In another example, the line stores block 304 may indicate the start and/or end of an output line and/or the start and/or end of a current picture. Providing information to the pixel buffer 306 and/or the chroma delay 320 may be performed on a clock cycle basis, for example.

Figure 5:
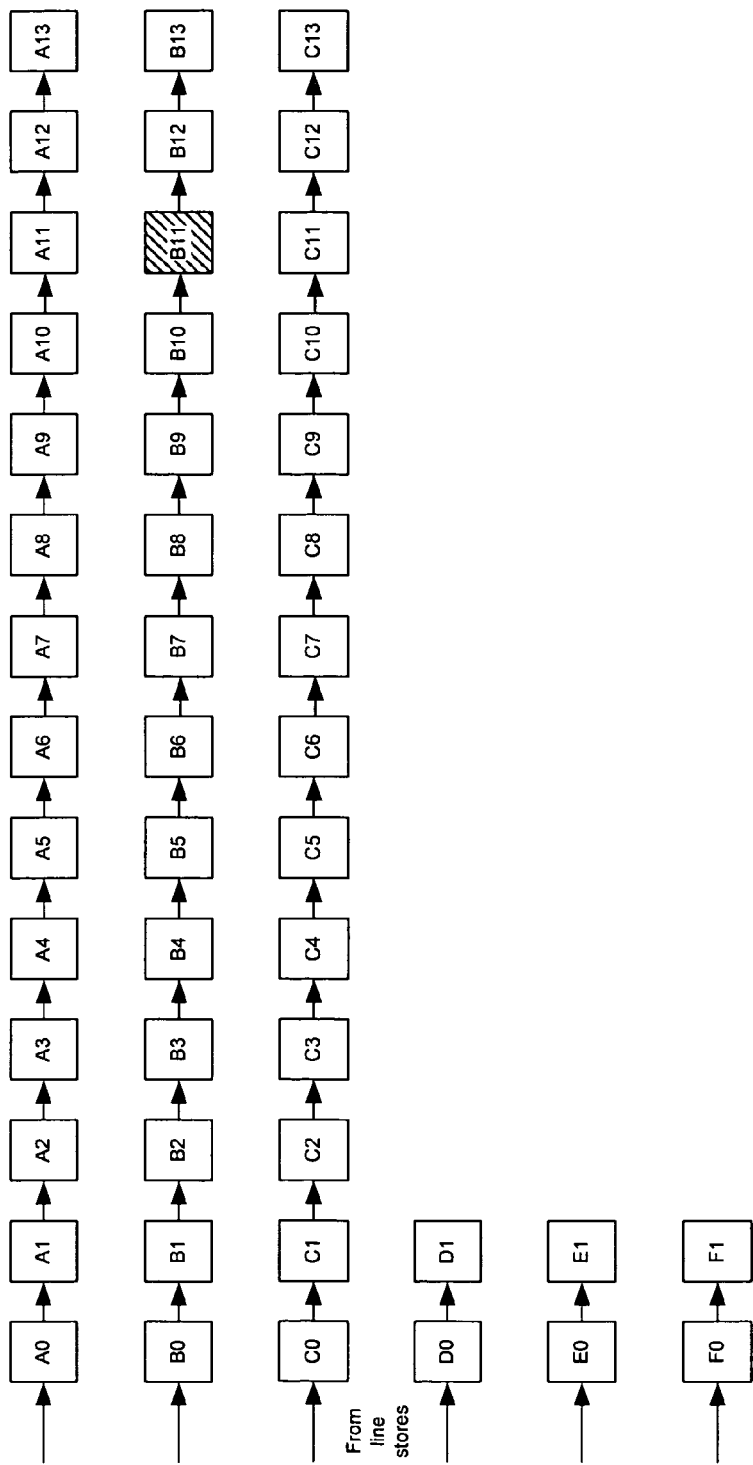
FIG. 5 illustrates an exemplary storage of line store luma output lines in the pixel buffer, in accordance with an embodiment of the invention.

FIG. 5 illustrates an exemplary storage of line store luma output lines in the pixel buffer, in accordance with an embodiment of the invention. Referring to FIG. 5, there is shown an exemplary organization of the stored luma output lines generated by the line stores block 304 in the pixel buffer 306 in FIG. 3. The topmost line of pixels labeled A0 through A13 may correspond to a previous output line. The line of pixels labeled B0 through B13 may correspond to a current output line. In this regard, the pixel labeled B11 may correspond to a current pixel being processed. When the line stores block 304 operates in an HD mode, the bottommost line of pixels to be processed may be the line of pixels labeled C0 through C13. When the line stores block 304 operates in an SD mode, the bottommost line of pixels to be processed may be the line of pixels labeled F0 through F1. In both cases the bottommost line of pixels may correspond to a next output line.

The lines of pixels labeled D0 through D1, E0 through E1, and F0 through F1 may be utilized for the SD mode of operation where six luma output lines may be generated by the line stores block 304 in FIG. 3. Moreover, two flops may be sufficient for handling these lines. Because pictures may be raster scanned from left to right, pixels in column 13, that is, pixels A13, B13, and C13, in the exemplary organization shown in FIG. 5 may correspond to the leftmost pixels in the pixel buffer 306 while pixels in column 0, that is, pixels A0, B0, and C0, may correspond to the rightmost pixels in the pixel buffer 306. In some instances, at least one of the register values as described in the exemplary organization shown in FIG. 5 may be removed to optimize the operation of the pixel buffer 306.

Figure 6:
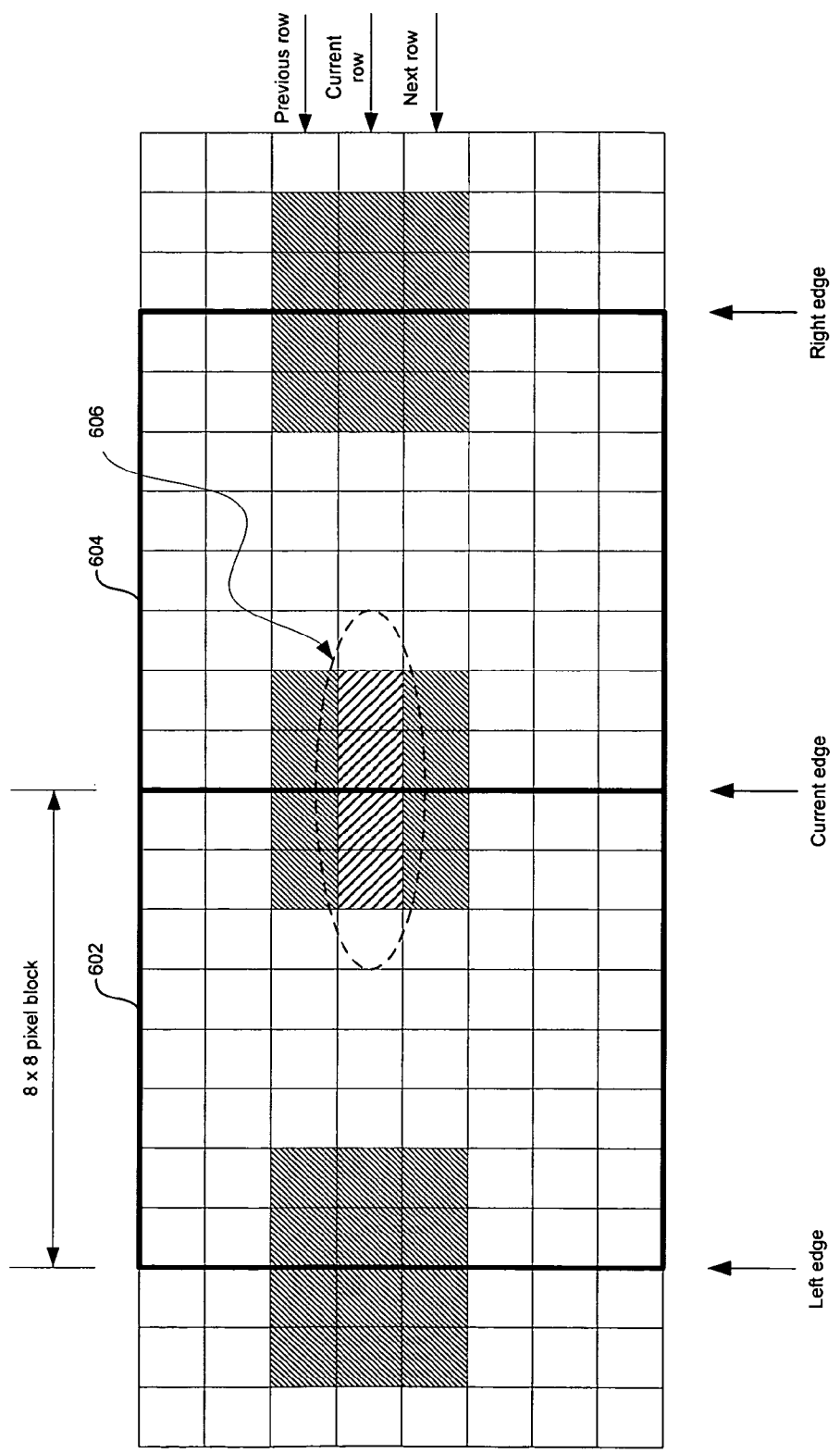
FIG. 6 illustrates exemplary vertical edge detection region for block noise reduction, in accordance with an embodiment of the invention.

FIG. 6 illustrates exemplary vertical edge detection region for block noise reduction, in accordance with an embodiment of the invention. Referring to FIG. 6, there is shown a first image block 602 adjacent to a second image block 604 in a video image. The image blocks shown may comprise, for example, an 8×8 array of pixels. The left vertical border of image block 602 may correspond to a left vertical edge for block noise reduction processing. The right vertical border of image block 602, which corresponds to the left vertical border of image block 604, may correspond to a current vertical edge for block noise reduction processing. The right vertical border of image block 604 may correspond to a right vertical edge for block noise reduction processing. Any of the current vertical edge, the left vertical edge, or the right vertical edge may also be referred to as a vertical edge. Edge-related parameters may be determined for each of the vertical edges and may be utilized to determine whether the vertical edge that coincides with the current vertical edge may be a result of blocking artifacts.

When determining edge-related parameters for any one of the vertical edges, a portion of the image comprising pixels neighboring the vertical edge may be utilized. These neighboring pixels may include a plurality of pixels to the left and to the right of the selected vertical edge. For example, as shown in FIG. 6, twelve pixels may be utilized per vertical edge. The twelve pixels are shown as narrowly spaced hashed lined pixels for either the left vertical edge or the right vertical edge. The twelve pixels are shown as eight narrowly-spaced hashed lined pixels in the previous and the next row of pixels for the current vertical edge and four widely-spaced hashed lined pixels in the current row of pixels for the current vertical edge. The twelve pixels may correspond to two pixels to the left and two pixels to the right of the vertical edge in a previous row of pixels, two pixels to the left and two pixels to the right in a current row of pixels, and two pixels to the left and two pixels to the right of the vertical edge in a next row of pixels. The number of pixels for determining edge parameters may depend on the application and/or the available memory in the DNR block 208 in FIG. 2. In this regard, more or fewer than twelve pixels may be utilized and more or fewer than three rows of pixels may be utilized when determining edge parameters. After determining the edge parameters, the widely spaced hashed-lined pixels in the current row of pixels for the current vertical edge may be further processed to reduce artifacts that may be related to block noise.

Figure 7A:
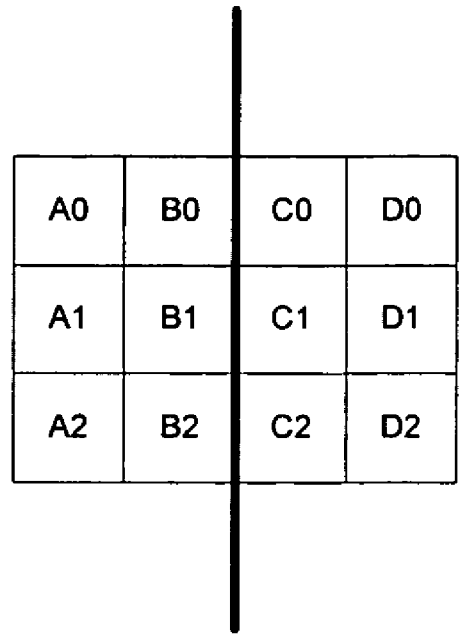
FIG. 7A illustrates an exemplary image portion for edge variance determination, in accordance with an embodiment of the invention.

FIG. 7A illustrates an exemplary image portion for edge variance determination, in accordance with an embodiment of the invention. Referring to FIG. 7A, the pixels for determining a plurality of edge-related parameters for a vertical edge may be labeled A0, B0, C0, and D0 for the previous row of pixels, A1, B1, C1, and D1 for the current row of pixels, and A2, B2, C2, and D2 for the next row of pixels. A vertical edge variance parameter for the vertical edge being processed may be determined by utilizing, for example, the following expression:

$$edge\_var=ABS(B0-C0)+ABS(B1-C1)+ABS(B2-C2),$$

where ABS corresponds to an absolute value operation. A background variance parameter for the image portion defined in FIG. 7A may be determined by utilizing, for example, the following expression:

$$backgnd\_var=MAX[(ABS(A0-B0)+ABS(A1-B1)+ABS(A2-B2)),(ABS(C0-D0)+ABS(C1-D1)+ABS(C2-D2))]$$

where the first value in the MAX operation corresponds to a left vertical variance parameter and the second value in the MAX operation corresponds to a right vertical variance parameter.

A first edge strength parameter (edge_strength) and a second edge strength parameter (edge_strength2) may be determined based on the edge variance parameter and the background variance parameter. For example, the first and second edge strength parameters may be determined as follows:

$$\text{edge\_strength}=\text{edge\_var}-b\_rel*\text{backgnd\_var}/4,$$

$$\text{edge\_strength2}=\text{edge\_var}-2*b\_rel*\text{backgnd\_var}/4,$$

where b_rel is a relative weight parameter that may be utilized to control the variance of the edge relative to the background and 4 may correspond to an exemplary scaling factor. In this regard, the value of b_rel may be part of and/or may be determined from the video signal information received by the DNR block 208 in FIG. 2. For example, smaller values of b_rel may result in stronger edge strengths and may allow for more filtering.

For each vertical edge, a maximum vertical parameter may be determined by the following exemplary expression:

$$\text{vert\_max}=\text{MAX}[ABS(B0-C0),ABS(B1-C1),ABS(B2-C2)].$$

Moreover, a first vertical edge clamping limit (limit) and a second vertical edge clamping limit (limit2) may be determined for every vertical edge based on edge strength values, the maximum vertical parameter, and a block core limit (b_core). The value of b_core may be determined so as to prevent filtering of very strong edge that are likely to be the result of image content. Exemplary expressions for determining the first and second vertical edge clamping limit may be as follows:

$$\text{limit}=\text{MIN}[\text{edge\_strength},(b\_core-\text{vert\_max})],$$

$$\text{limit2}=\text{MIN}[\text{edge\_strength2},(b\_core-\text{vert\_max})].$$

The value of b_core may be part of and/or may be determined from the video signal information received by the DNR block 208 in FIG. 2. For example, larger values of b_core may allow filtering of stronger edges. The values for limit and limit2 may be determined for the current vertical edge, for the left vertical edge, and/or for the right vertical edge. In this regard, the limits for the current vertical edge may be referred to as current vertical edge clamping limits, the limits for the left vertical edge may be referred to as left vertical edge clamping limits, and the limits for the right vertical edge may be referred to as right vertical edge clamping limits.

The clamping limits for the current vertical edge, the left vertical edge, and the right vertical edge may be combined to provide a first vertical combined clamping limit (combined_limit) based on the values of limit for the vertical edges and a second vertical combined clamping limit (combined_limit2) based on the values of limit2 for the vertical edges. In this regard, the first and second vertical combined clamping limits may be utilized for processing the widely-spaced hashed-lined pixels in the current row of pixels for the current vertical edge as shown in FIG. 6. The values of combined_limit and combined_limit2 may be determined by the following exemplary expressions:

$$\text{temp}=\text{MAX}[\text{limit\_left},\text{limit\_right}]+b\_core/8,$$

$$\text{temp2}=\text{MAX}[\text{limit2\_left},\text{limit2\_right}]+b\_core/8,$$

$$\text{if (temp}<\text{lower\_limit})\{\text{temp}=\text{lower\_limit}\}$$

$$\text{if (temp2}<\text{lower\_limit2})\{\text{temp2}=\text{lower\_limit2}\}$$

$$\text{combined\_limit}=\text{MIN}(\text{temp},\text{limit\_current}),$$

$$\text{combined\_limit2}=\text{MIN}(\text{temp2},\text{limit\_current2}),$$

where temp corresponds to a temporary variable for storing the maximum of the first left vertical edge clamping limit (limit_left) and the first right vertical edge clamping limit (limit_right), temp2 corresponds to a temporary variable for storing the maximum of the second left vertical edge clamping limit (limit_left2) and the second right vertical edge clamping limit (limit_right2), lower_limit and lower_limit2 may correspond to lower limits that may be allowed for temp and temp2 respectively, MIN corresponds to a minimum operation, limit_current corresponds to the first current vertical edge clamping limit, limit_current2 corresponds to the second current vertical edge clamping limit, and 8 is an exemplary scaling factor. The values of lower_limit and lower_limit2 may be selected to, for example, avoid negative vertical combined clamping limit values.

Figure 7B:
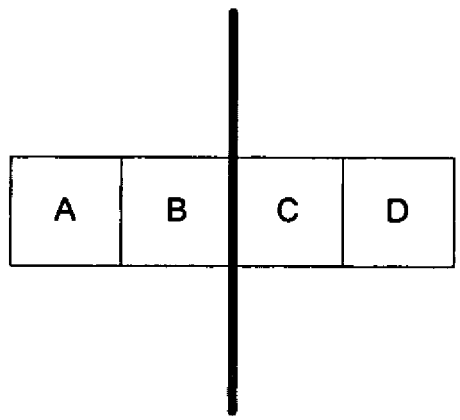
FIG. 7B illustrates an exemplary notation that may be utilized for vertical edge filtering, in accordance with an embodiment of the invention.

FIG. 7B illustrates an exemplary notation that may be utilized for vertical edge filtering, in accordance with an embodiment of the invention. Referring to FIG. 7B, there are shown pixels labeled A, B, C, and D that are located in a current row of pixels in the current vertical edge. In this regard, the pixel labeled B is located to the left of the current vertical edge and the pixel A is located to the left of the pixel labeled B. Similarly, the pixel labeled C is located to the right of the current vertical edge and the pixel labeled D is located to the right of the pixel labeled C.

The values of the pixels labeled A, B, C, and D may be filtered and the new filtered values A', B', C', and D' may be given as:

$$A'=(13A+3C+8)/16,$$

$$B'=(10B+6C+8)/16,$$

$$C'=(6B+10C+8)/16, \text{ and}$$

$$D'=(3B+13D+8)/16.$$

A difference parameter may be determined based on an original pixel value (original_pix) and a filtered pixel value (filt_pix). For example, the difference parameter may be determined by:

$$\text{diff}=\text{filt\_pix}-\text{original\_pix}.$$

A vertical block noise reduction difference parameter (VBNR_diff) may be determined based on the difference parameter and the clamping limits. An exemplary VBNR_diff may be determined as follows:

```
if (pixel position corresponds to pixel labeled A or D)
    {VBNR_diff = CLAMP(diff, –combined_limit2,
    +combined_limit2) }
else if (pixel position correspond to pixel labeled B or C)
    {VBNR_diff = CLAMP(diff, –combined_limit,
    +combined_limit) }
else
    {VBNR_diff = 0}
``` where CLAMP may correspond to a clamping or limiting operation. Limiting the filtering operation may be performed to ensure that strong vertical edges may be filtered while very strong vertical edges may not be filtered since they may correspond to image content. The limits may be soft and may have gradual turn-offs. Edges that occur in relatively flat backgrounds may affect all of the pixels labeled A, B, C, and D. However, the when noisier backgrounds occur, the filtering may be limited so that only the pixels labeled B and C may be adjusted.

Figure 8A:
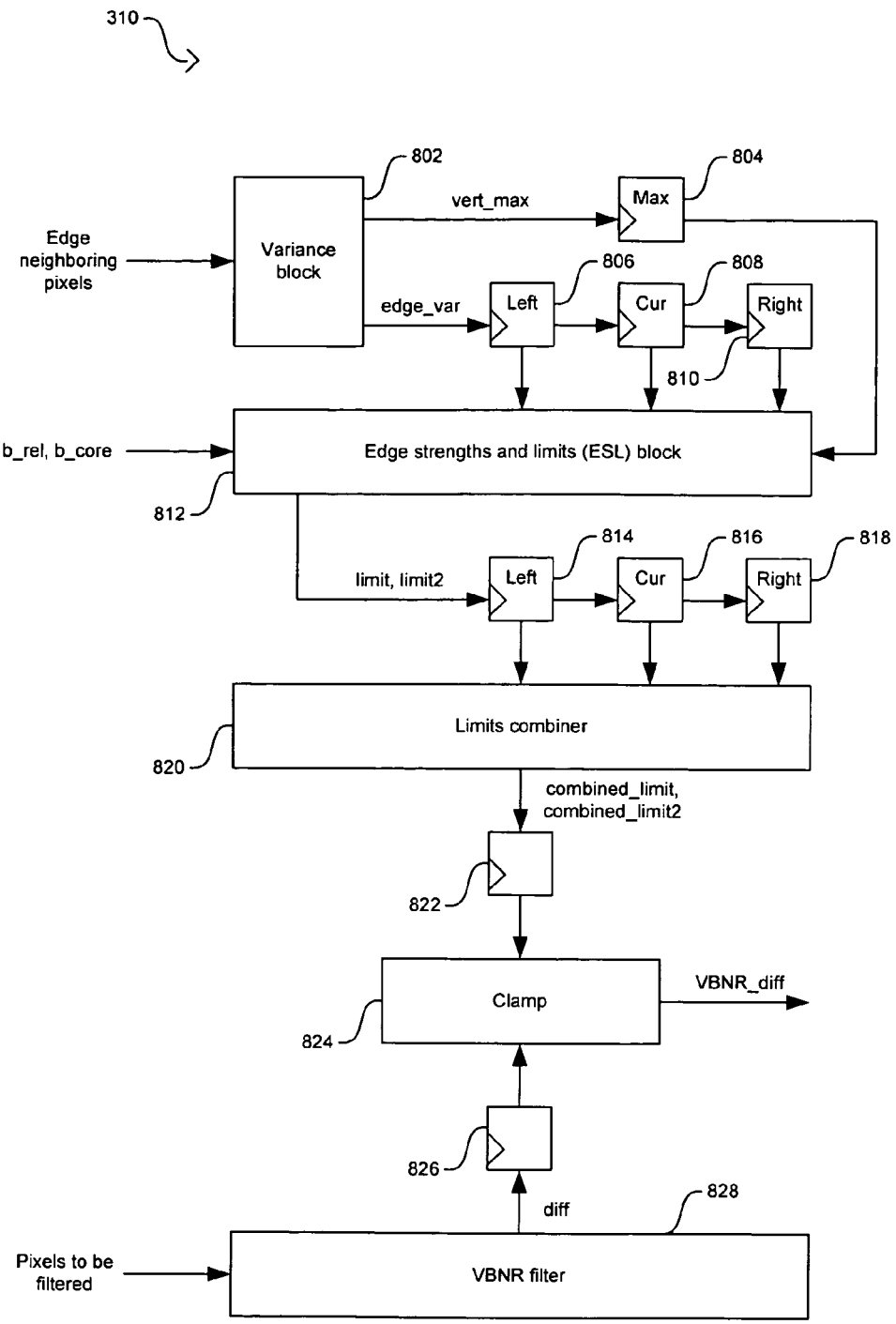
FIG. 8A is a block diagram of an exemplary vertical BNR block, in accordance with an embodiment of the invention.

FIG. 8A is a block diagram of an exemplary vertical BNR block, in accordance with an embodiment of the invention. Referring to FIG. 8A, the VBNR block 310 in FIG. 3 may comprise a variance block 802, a max latch 804, a left latch 806, a current latch 808, a right latch 810, an edge strengths and limits (ESL) block 812, a left latch 814, a current latch 816, a right latch 818, a limits combiner 820, a latch 822, a clamping block 824, a latch 826, and a vertical block noise reduction (VBNR) filter 828.

The variance block 802 may comprise suitable logic, circuitry, and/or code that may be adapted to determine a vertical edge variance parameter (edge_var) and a maximum vertical parameter (vert_max) for a vertical edge being processed. The max latch 804, the left latch 806, the current latch 808, the right latch 810, the left latch 814, the current latch 816, the right latch 818, the latch 822, and the latch 826 may comprise suitable logic and/or circuitry that may be adapted to store information. The variance block 802 may transfer the value of vert_max to the max latch 804 and the value of edge_var to the left latch 806. The value in left latch 806 may be transferred to current latch 808 and then from the current latch 808 to the right latch 810. For example, after three clock cycles the variance block 802 may have determined the edge_var and vert_max values for a current vertical edge, a left vertical edge, and a right vertical edge.

The ESL block 812 may comprise suitable logic, circuitry, and/or code that may be adapted receive the vertical edge variance parameters and the maximum vertical parameters for the current vertical edge, the left vertical edge, and the right vertical edge and determine the edge strength parameters (edge_strength, edge_strength2) and the vertical edge clamping limits (limit, limit2) for each of these vertical edges. In this regard, the ESL block 812 may utilize the relative weight parameter (b_rel) and/or the block core limit (b_core) during processing. The ESL block 812 may transfer the values for the vertical edge clamping limits to the left latch 814. The value in the left latch 814 may be transferred to the current latch 816 and then from the current latch 816 to the right latch 818. The limits combiner 820 may comprise suitable logic, circuitry, and/or code that may be adapted to receive the right vertical edge clamping limits, the current vertical edge clamping limits, and the right vertical edge clamping limits and determine the first vertical combined clamping limit (combined_limit) and the second vertical combined clamping limit (combined_limit2) to be utilized with the pixels labeled A, B, C, and D in FIG. 7B. The limits combiner 820 may be adapted to transfer the values for combined_limit and combined_limit2 to the latch 822. The latch 822 may be adapted to transfer the values of combined_limit and combined_limit2 to the clamping block 824.

The VBNR filter 828 may comprise suitable logic, circuitry, and/or code that may be adapted to filter the original values of the pixels labeled A, B, C, and D in FIG. 7B and to determine a difference parameter (diff) based on the original and filtered values. The values of the filter coefficients utilized by the VBNR filter 828 may be programmable via, for example, the host processor 204 and/or via a register direct memory access (DMA). The VBNR filter 828 may be adapted to transfer the value of the difference parameter to the latch 826. The latch 826 may be adapted to transfer the value of the difference parameter to the clamping block 824. The clamping block 824 may comprise suitable logic, circuitry, and/or code that may be adapted to determine the vertical block noise reduction difference parameter (VBNR_diff) based on the values of combined_limit, combined_limit2, and diff. In this regard, the clamping block 824 may clamp or limit the value of the difference parameter based on the value of combined_limit when processing the pixels labeled B or C in FIG. 7B. Moreover, the clamping block 824 may clamp or limit the value of the difference parameter based on the value of combined_limit2 when processing the pixels labeled A or D in FIG. 7B. The clamping block 824 may be adapted to transfer the value of VBNR_diff to the combiner 312 in FIG. 3.

When processing the first and last vertical edges in a video image, that is, the picture border or boundary, filtering may not be utilized. In this regard, the vertical combined edge clamping limits may be set to zero, for example. When processing the next to the first and next to the last vertical edges in a video image, the values of temp and temp2 may be set to b_core/4, for example.

Figure 8B:
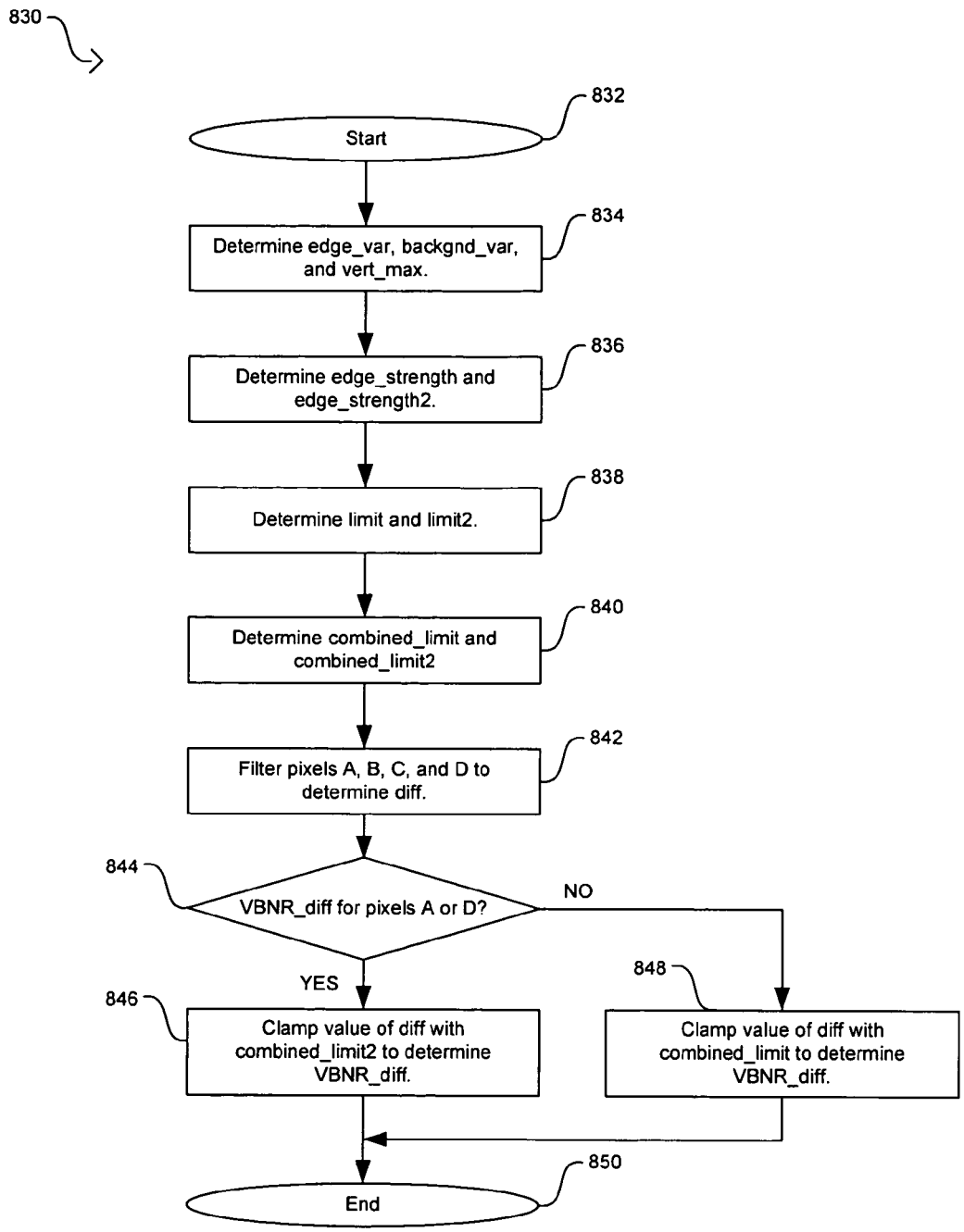
FIG. 8B is a flow diagram illustrating exemplary steps in the operation of the vertical BNR block, in accordance with an embodiment of the invention.

FIG. 8B is a flow diagram illustrating exemplary steps in the operation of the vertical BNR block, in accordance with an embodiment of the invention. Referring to FIG. 8B, after start step 832, in step 834, the parameters edge_var, backgnd_var, and vert_max may be determined for the left vertical edge, the current vertical edge, and the right vertical edge. In step 836, the parameters edge_strength and edge_strength2 may be determined for the vertical edges based on the values of edge_var, backgnd_var, and b_rel. In step 838, the parameters limit and limit2 may be determined for the vertical edges based on the values of edge_strength and edge_strength2, respectively, and the values for vert_max and b_core. In step 840, the parameters combined_limit and combined_limit2 may be determined for the current vertical edge based on the values of limit and limit 2 for the vertical edges. In step 842, the pixels labeled A, B, C, and D may be filtered and the value of the parameter diff may be determined based on the filtered and original pixel values.

In step 844, it may be determined whether the parameter VBNR_diff is to be determined for the pixels labeled A or D. When the parameter VBNR_diff is to be determined for the pixels labeled A or D, then the process may proceed to step 846 where the value of parameter diff may be clamped based on the value of combined_limit2. When the parameter VBNR_diff is to be determined for the pixels labeled B or C, then the process may proceed to step 848 where the value of parameter diff may be clamped based on the value of combined_limit. After steps 846 or 848, the process may proceed to end step 850.

Figure 9A:
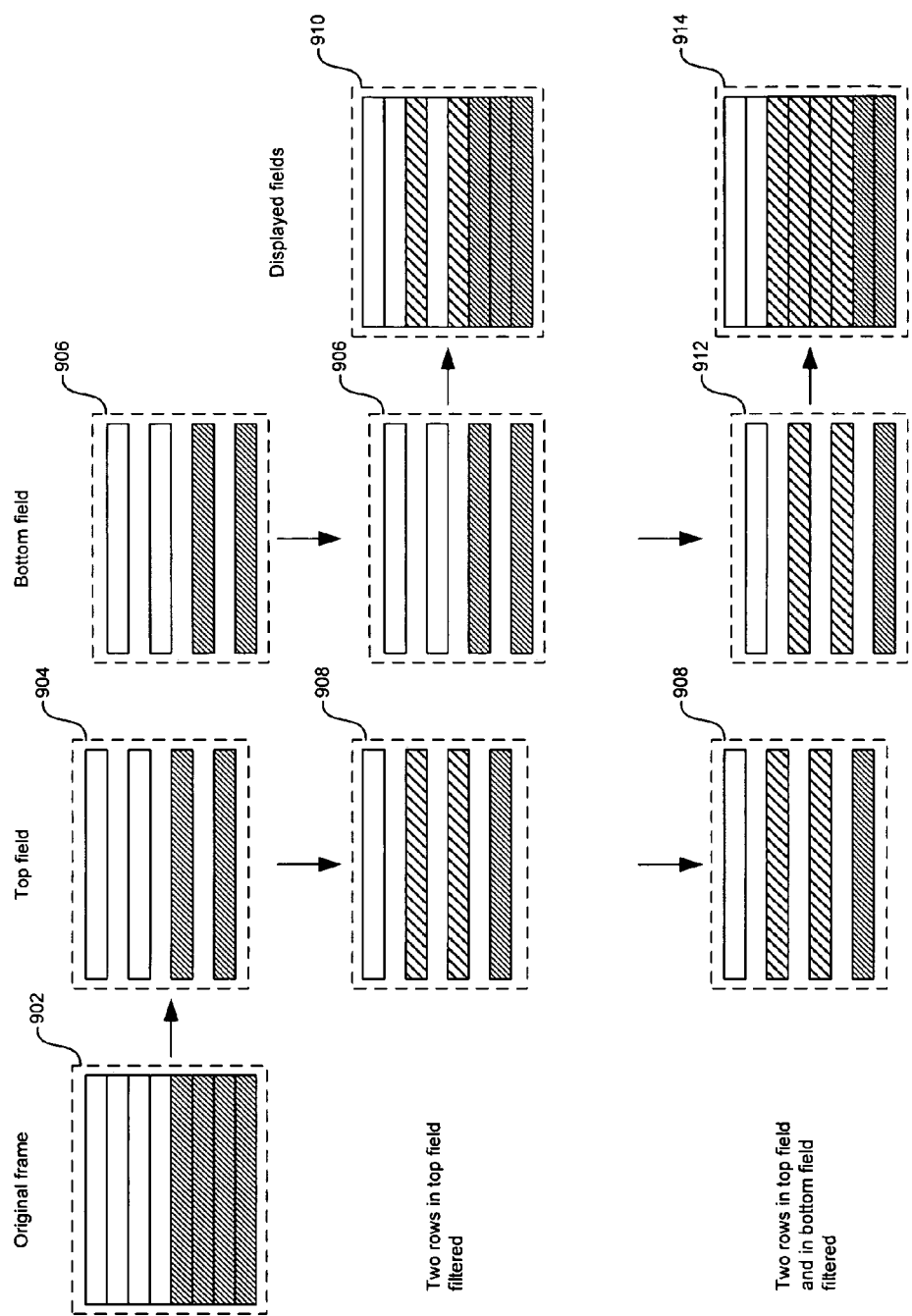
FIG. 9A illustrates exemplary problems that may be associated with horizontal edge filtering in interlaced video, in connection with an embodiment of the invention.

FIG. 9A illustrates exemplary problems that may be associated with horizontal edge filtering in interlaced video, in connection with an embodiment of the invention. Referring to FIG. 9A, there is shown an original frame 902 of a video image comprising eight rows of pixels. The white shaded rows of pixels and the narrowly spaced hashed lined rows of pixels result in a horizontal edge being detected between the white shaded portion of the video image and the narrowly spaced hashed lined portion of the video image. The top field 904 of the frame comprises two of the white shaded rows of pixels and two of the narrowly spaced hashed lined rows of pixels from the frame. The bottom field 906 of the frame comprises the two remaining white shaded rows of pixels and the two remaining narrowly spaced hashed lined shaded rows of pixels from the frame.

When considering the top field 904, a horizontal edge may be detected between the second row from the top and the third row from the top. When considering the bottom field 906, a horizontal edge may be detected between the second row from the top and the third row from the top. In some instances, only the top field may be filtered and the values of at least a portion of the pixels in the second and third row from the top in the top field may change to reduce block noise. The filtered rows of pixels in a filtered top field 908 are shown as widely spaced hashed lined rows of pixels. When the filtered top field 908 and the bottom field 906 are displayed, a hanging row may occur as shown in filtered frame 910 and the effect of reducing block noise may not provide a visually pleasing experience for a viewer. In other instances, the top and bottom fields may be filtered and the values of at least a portion of the pixels in the second and third row from the top for both the top field 904 and the bottom field 906 may change. The filtered rows of pixels in the filtered top field 908 and a filtered bottom field 912 are shown as widely spaced hashed lined rows of pixels. When the filtered top field 908 and the filtered bottom field 912 are displayed, the effects of reducing block noise may be spread over four rows of pixels as shown in filtered frame 914 and may not provide a visually pleasing experience for a viewer.

There may be some differences between the presence of horizontal edges and vertical edges that result from block noise. For example, the horizontal edges may be generally less noticeable. The horizontal edges may be more difficult to process in interlaced video. The horizontal edges may require line stores to detect and filter.

Figure 9B:
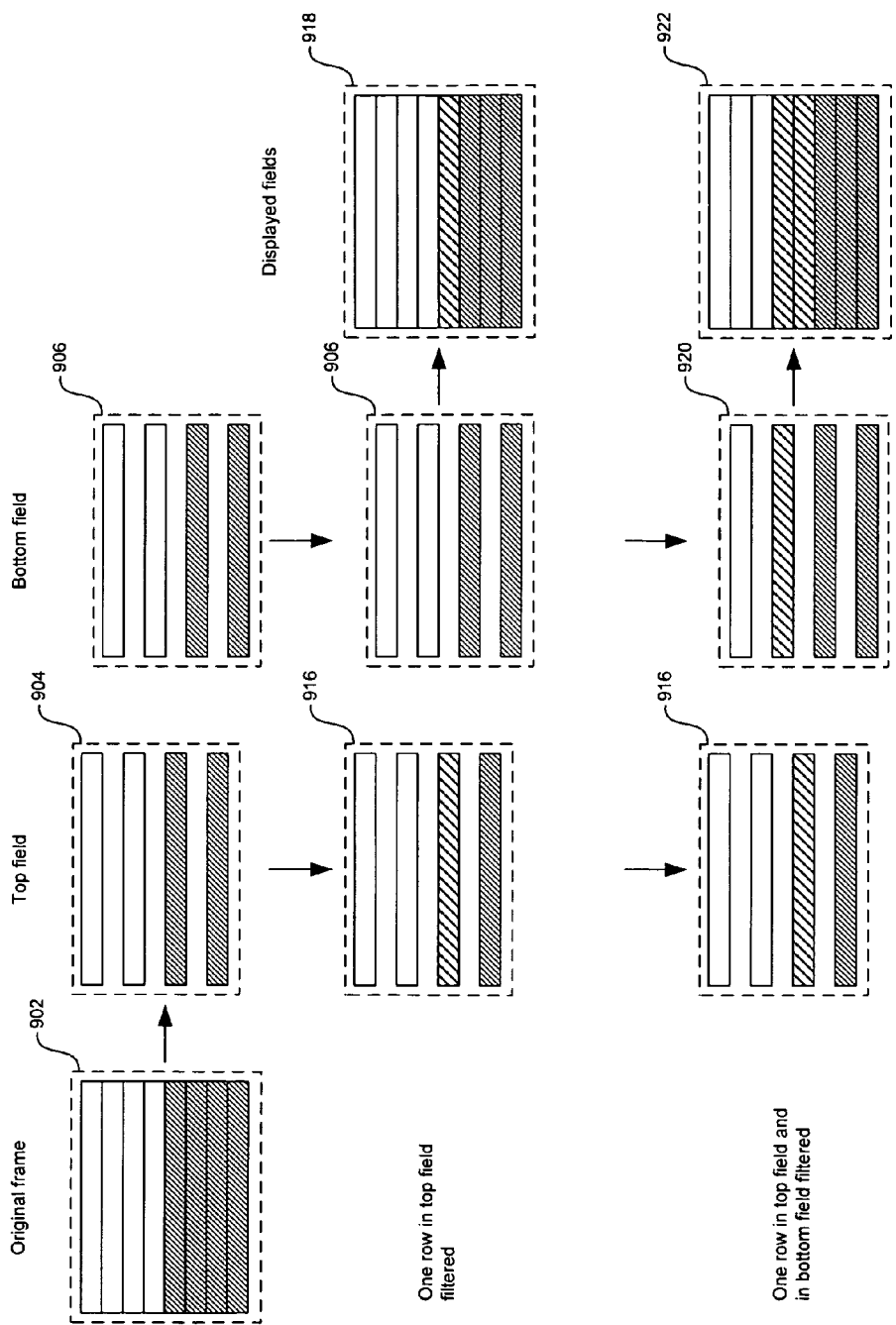
FIG. 9B illustrates exemplary horizontal edge filtering for interlaced video, in accordance with an embodiment of the invention.

FIG. 9B illustrates exemplary horizontal edge filtering for interlaced video, in accordance with an embodiment of the invention. Referring to FIG. 9B, there is shown the original frame 902 of video image as in FIG. 9A. In this exemplary approach, when considering the top field 904, a horizontal edge may be detected between the second row from the top and the third row from the top. When considering the bottom field 906, a horizontal edge may be detected between the second row from the top and the third row from the top.

In some instances, only the top field 904 may be filtered and the values of at least a portion of the pixels in the third row from the top in the top field 904 may change to reduce block noise. The filtered rows of pixels in the filtered top field 916 are shown as widely spaced hashed lined rows of pixels. When the filtered top field 916 and the bottom field 906 are displayed, no hanging row occurs as shown in filtered frame 918 and the effect of reducing block noise may provide a more visually pleasing experience for a viewer. In other instances, the top and bottom fields may be filtered and the values of at least a portion of the pixels in the third row from the top for both the top field 904 and the values of at least a portion of the pixels in the second row from the top for the bottom field 906 may change. The filtered rows of pixels are shown as widely spaced hashed lined rows of pixels in the filtered top field 916 and the filtered bottom field 920. When the filtered top field 916 and the filtered bottom field 920 are displayed, the effects of reducing block noise may be spread over only two rows of pixels as shown in the filtered frame 922 and may provide a more visually pleasing experience for a viewer. In this regard, filtering may be performed with 2-tap filters and/or smaller limits.

Figure 10A:
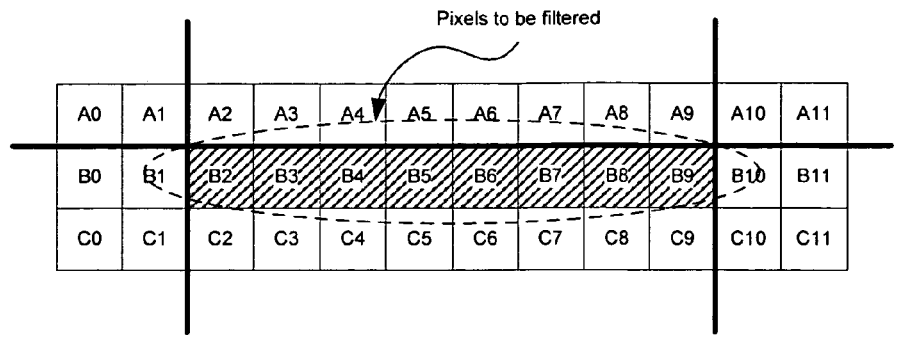
FIGS. 10A-10C illustrate exemplary vertical and/or horizontal detection, in accordance with an embodiment of the invention.
Figure 10B:
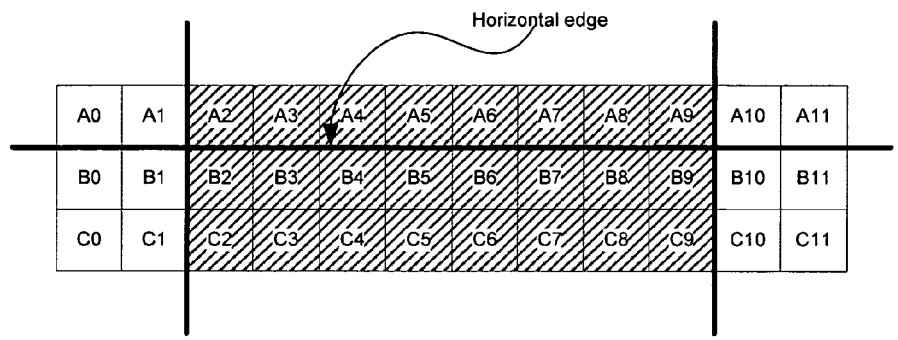
Figure 10C:
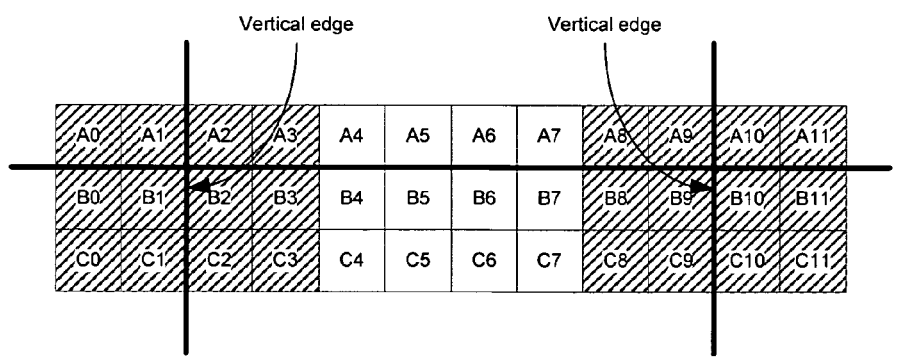

FIGS. 10A-10C illustrate exemplary vertical and/or horizontal detection, in accordance with an embodiment of the invention. Referring to FIG. 10A, there is shown a region of an image that comprises a top border of an image block with a top row of pixels that comprises the pixels labeled B2 through B9. The top row of pixels of the image block is indicated by widely spaced hashed lines. When a horizontal edge is detected, the pixels labeled B2 through B9 in the top row of the image block that is adjacent to the horizontal edge may be filtered to reduce the effect of block noise. Referring to FIG. 10B, there is shown an exemplary region of the image that may be utilized for detecting a horizontal edge adjacent to the top border of an image block. The region comprises the pixels labeled A2 through A9, the pixels labeled B2 through B9, and the pixels labeled C2 through C9. Widely spaced hashed lines indicate the pixels in the detection region.

Referring to FIG. 10C, to detect the presence of a horizontal edge at the top border of an image block, at least one vertical edge on a vertical border of the image block may also be selected. There is shown in FIG. 10C exemplary regions of the image that may be utilized for detecting at least one vertical edge on a vertical border of the image block. For the left vertical border, the exemplary region may comprise the pixels labeled A0 through A3, the pixels labeled B0 through B3, and the pixels labeled C0 through C3. For the right vertical border, the exemplary region may comprise the pixels labeled A8 through A11, the pixels labeled B8 through B11, and the pixels labeled C8 through C11. Widely spaced hashed lines indicate the pixels in the detection region. While FIGS. 10A-10C indicate an exemplary approach that may be followed for detecting the presence of a horizontal edge adjacent to the top row of pixels in the image block, a similar approach may also be followed for detecting the presence of a horizontal edge adjacent to the bottom row of pixels in the image block.

A horizontal edge variance parameter for the horizontal edge being processed may be determined by computing for every image block and for every pixel that comes in the following exemplary expressions:

$$vvar\_top=SUM[ABS(A0-B0)],$$

$$vvar\_bottom=SUM[ABS(B0-C0)],$$

$$max\_top=MAX[ABS(A0-B0)],$$

$$max\_bottom=MAX[ABS(B0-C0)],$$

where SUM corresponds to an addition operation, vvar_top is a top field variance parameter, vvar_bottom is a bottom field variance parameter, max_top is a maximum top field variance, and max_bottom is a maximum bottom field variance. The computations may be performed cumulative over every horizontal edge. For example, the values for vvar_top, vvar_bottom, maxt_top, and max_bottom may be determined for all 8 columns of pixels in a horizontal edge. These values may be determined serially as the pixels are shifted through the pixel buffer 306 in FIG. 3. Once these values are determined, they may be latched or stored before further processing takes place.

For pixels in a row of pixels that is above a horizontal edge in a top field or above a horizontal edge in a frame when progressive video is utilized, a current horizontal edge clamping limit (limit) may be determined by the following expression:

$$limit=vvar\_top-b\_rel*vvar\_bottom/4,$$

where b_rel is the relative weight parameter utilized by the VBNR block 310 in FIGS. 3 and 4 corresponds to an exemplary scaling factor. For pixels in a row of pixels that is below a horizontal edge in a bottom field or below a horizontal edge in a frame when progressive video is utilized, a current horizontal edge clamping limit (limit) may be determined by the following expression:

$$limit=vvar\_bottom-b\_rel*vvar\_top/4,$$

where b_rel is again the relative weight parameter utilized by the VBNR block 310 and 4 corresponds to an exemplary scaling factor. In any other instance, the value of the current horizontal edge clamping limit (limit) may be set to zero. The value of the parameter limit may also be scaled and further limited by the following expressions:

$$limit=limit/4,$$

$$limit=MIN[limit,b\_core-max\_vvar],$$

where b_core is the block core limit utilized by the VBNR block 310, and max_vvar corresponds to the value of max_ top when the bottom row of pixels in an image block for bottom fields or progressive video are to be filtered and max_vvar corresponds to the value of max_bottom when the top row of pixels in an image block for top fields or progressive video are to be filtered.

For the currently selected image block, the VBNR block 310 may have been used to determine a left vertical edge clamping limit (limit_left) and a current vertical edge clamping limit (limit_current) that may be utilized for determining whether vertical edges also exist in the current image block. In this regard, a current vertical-horizontal edge clamping limit (hlimit) may be determined as follows:

$$h\text{limit}=\text{MAX}[\text{limit\_left},\text{limit\_current}].$$

When portions of a horizontal edge extend beyond the boundaries of a video image, the horizontal edge may not be filtered. When a horizontal edge starts and/or ends in a video image boundary, and/or close to the video image boundary, it may only have one vertical edge. In this instance, the value of the parameter hlimit may be set to the vertical edge clamping limit value of the existing vertical edge.

The value of the current horizontal edge clamping limit (limit) and the value of the current vertical_horizontal edge clamping limit (hlimit) may be combined to determine a horizontal combined clamping limit (combined_limit) based on the following expression:

$$\text{combined\_limit}=\text{MIN}[\text{limit},h\text{limit}],$$

$$\text{if (combined\_limit}<0)\{\text{combined\_limit}=0\}.$$

A filter may be applied to all the pixels in the row adjacent to the horizontal edge. For the top row of pixels in an image block for top fields or progressive video, the exemplary value of a filtered pixel (filt_pixel) may be given by the following expression:

$$\text{filt\_pixel}=(B*5+A*3+4)/8,$$

where B corresponds to the value of the B-labeled pixels, A corresponds to the value of the corresponding A-labeled pixels, and 8 is an exemplary scaling factor. For the bottom row of pixels in an image block for bottom fields or progressive video, the exemplary value of a filtered pixel (filt_pixel) may be given by the following expression:

$$\text{filt\_pixel}=(B*5+C*3+4)/8,$$

where B corresponds to the value of the B-labeled pixels, C corresponds to the value of the corresponding C-labeled pixels, and 8 is an exemplary scaling factor. A difference parameter may be determined based on an original pixel value (original_pix) and a filtered pixel value (filt_pix). For example, the difference parameter may be determined by:

$$\text{diff}=\text{filt\_pix}-\text{original\_pix}.$$

A horizontal block noise reduction difference parameter (HBNR_diff) may be determined based on the difference parameter and the horizontal combined clamping limit (combined_limit). An exemplary HBNR_diff may be determined as follows:

$$\text{HBNR\_diff}=\text{CLAMP}(\text{diff},-\text{combined\_limit},+\text{combined\_limit})$$

where CLAMP may correspond to a clamping or limiting operation.

Figure 11A:
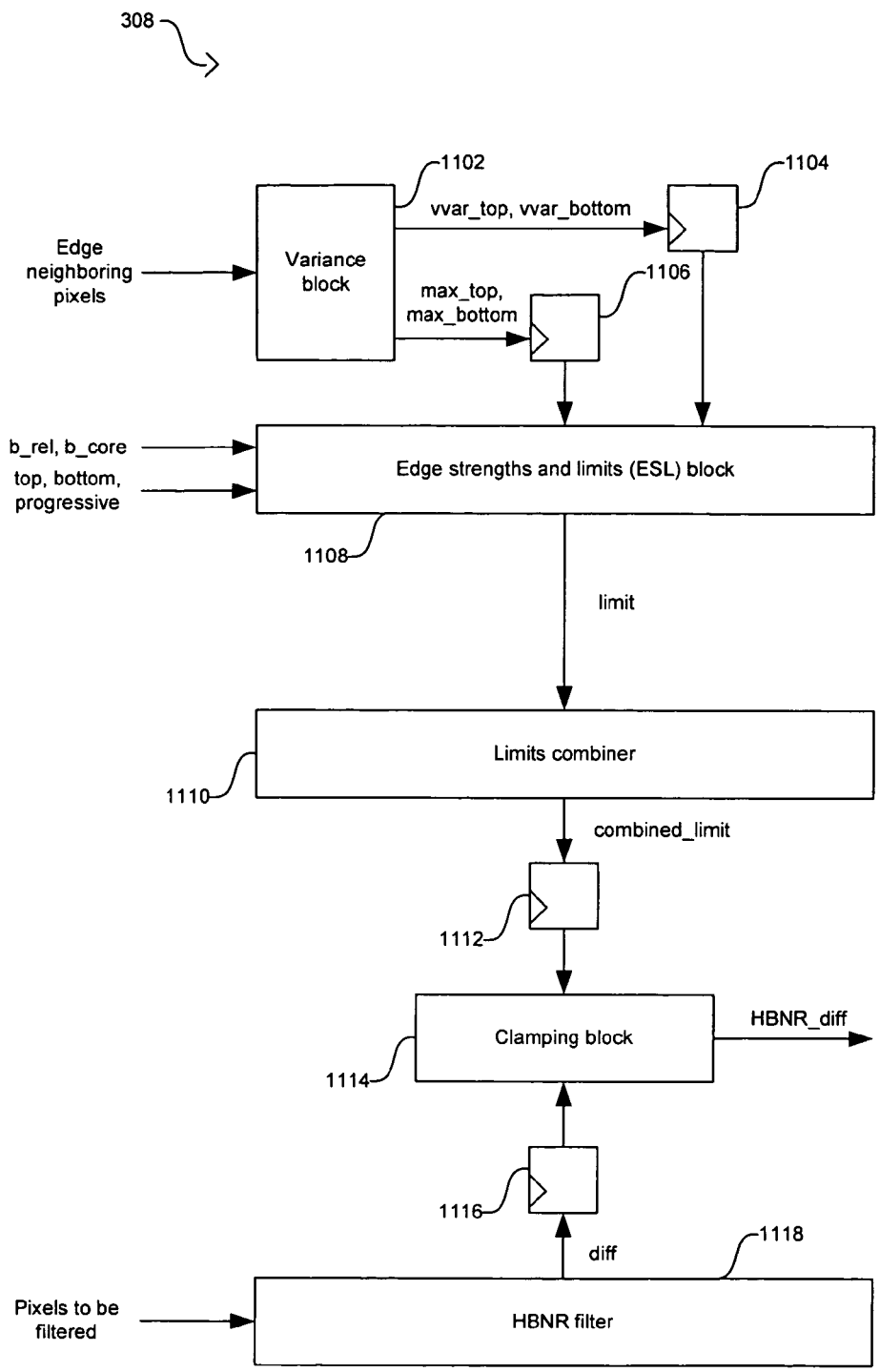
FIG. 11A is a block diagram of an exemplary horizontal BNR block, in accordance with an embodiment of the invention.

FIG. 11A is a block diagram of an exemplary horizontal BNR block, in accordance with an embodiment of the invention. Referring to FIG. 11A, the HBNR block 308 in FIG. 3 may comprise a variance block 1102, a latch 1104, a latch 1106, an edge strengths and limits (ESL) block 1108, a limits combiner 1110, a latch 1112, a clamping block 1114, a latch 1116, and a horizontal block noise reduction (VBNR) filter 1118. The variance block 1102 may comprise suitable logic, circuitry, and/or code that may be adapted to determine the parameters vvar_top, vvar_bottom, max_top, and max_bottom for a horizontal edge being processed. The latches 1104, 1106, 1112, and 1116 may comprise suitable logic and/or circuitry that may be adapted to store information. The variance block 1102 may transfer the values of vvar_top and vvar_bottom to the latch 1104 and the values of max_top and max_bottom to the latch 1106.

The ESL block 1108 may comprise suitable logic, circuitry, and/or code that may be adapted receive the horizontal edge parameters stored in the latches 1104 and 1106 to determine the value of the current horizontal edge clamping limit (limit). In this regard, the ESL block 1108 may utilize the relative weight parameter (b_rel), the block core limit (b_core) during processing, and/or information regarding whether the video signal is interlaced video and the current field is a top field or bottom field or whether the video signal is progressive video. The ESL block 1108 may transfer the value for the current horizontal edge clamping limit to the limits combiner 1110. The limits combiner 1110 may comprise suitable logic, circuitry, and/or code that may be adapted to receive the current horizontal edge clamping limit, the current vertical edge clamping limit, and the left vertical edge clamping limit to determine the horizontal combined clamping limit (combined_limit) to be utilized with the pixels in the row of pixels adjacent to the horizontal edge. The limits combiner 1110 may be adapted to transfer the values for combined_limit to the latch 1112. The latch 1112 may be adapted to transfer the values of combined_limit to the clamping block 1114.

The HBNR filter 1118 may comprise suitable logic, circuitry, and/or code that may be adapted to filter the original values of the pixels in the row of pixels adjacent to the horizontal edge and to determine a difference parameter (diff) based on the original and filtered values. The values of the filter coefficients utilized by the HBNR filter 1118 may be programmable via, for example, the host processor 204 and/or via a register direct memory access (DMA). The HBNR filter 1118 may be adapted to transfer the value of the difference parameter to the latch 1116. The latch 1116 may be adapted to transfer the value of the difference parameter to the clamping block 1114. The clamping block 1114 may comprise suitable logic, circuitry, and/or code that may be adapted to determine the horizontal block noise reduction difference parameter (HBNR_diff) based on the values of combined_limit and diff. The clamping block 1114 may be adapted to transfer the value of HBNR_diff to the combiner 312 in FIG. 3.

When processing the first and last vertical edges in a video image, that is, the picture border or boundary, filtering may not be utilized. In this regard, the vertical combined edge clamping limits may be set to zero, for example. When processing the next to the first and next to the last vertical edges in a video image, the values of temp and temp2 may be set to b_core/4, for example.

Figure 11B:
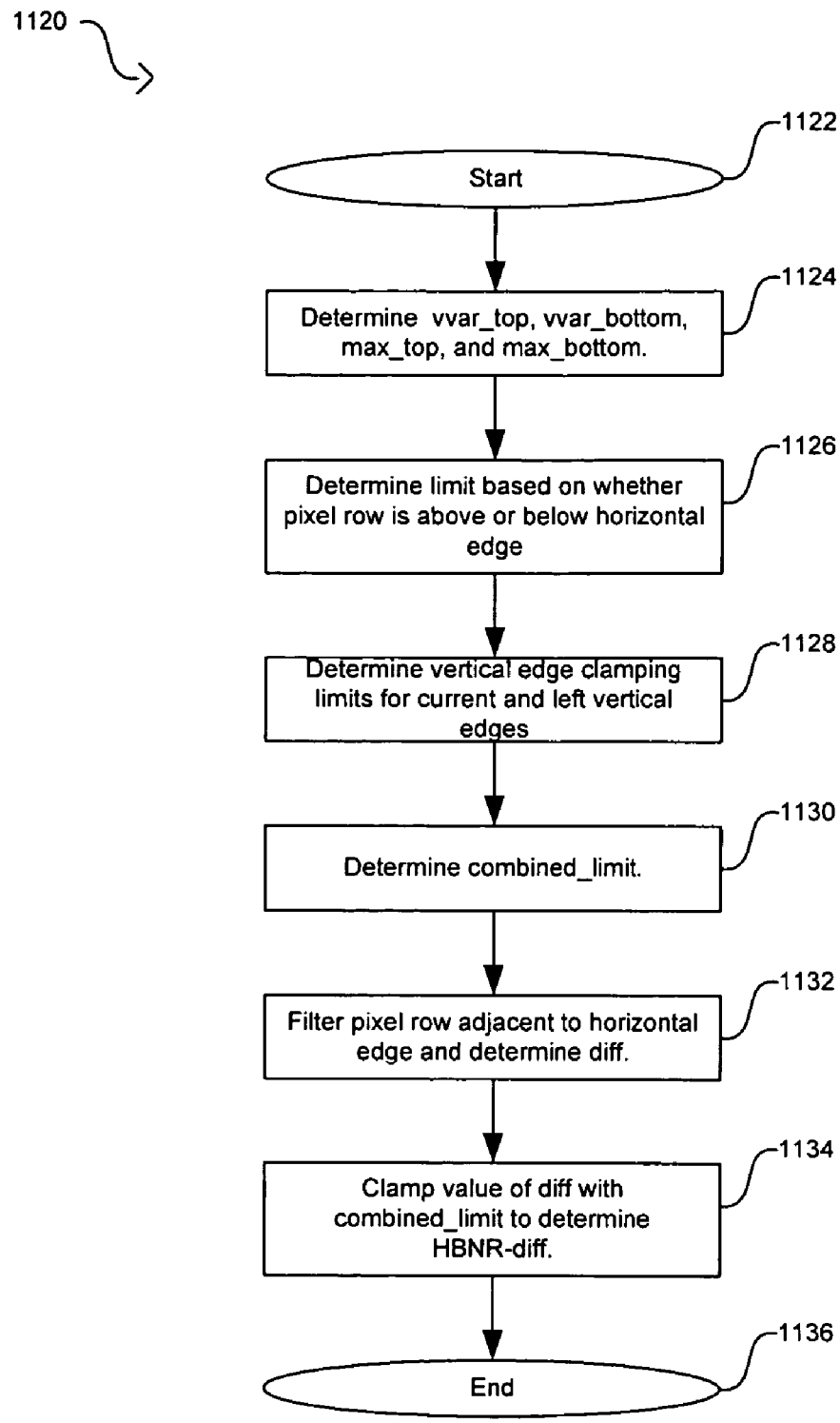
FIG. 11B is a flow diagram illustrating exemplary steps in the operation of the horizontal BNR block, in accordance with an embodiment of the invention.

FIG. 11B is a flow diagram illustrating exemplary steps in the operation of the horizontal BNR block, in accordance with an embodiment of the invention. Referring to FIG. 11B, after start step 1122, in step 1124, the parameters vvar_top, vvar_bottom, max_top, and max_bottom may be determined for current horizontal edge in a selected image block. In step 1126, the parameter limit may be determined in accordance with whether the pixels to be filtered are located above the horizontal edge or below the horizontal edge. In step 1128, the current vertical edge clamping limit (limit_current) and the left vertical edge clamping limit (limit_left) may be utilized to determine the parameter hlimit. In this regard, the VBNR block 310 may have determined limit_current and limit_left already during vertical edge detection operations. In step 1130, the parameter combined_limit may be determined for the current horizontal edge based on the values of limit and hlimit. In step 1132, the row of pixels adjacent to the horizontal edge may be filtered and the value of the parameter diff may be determined based on the filtered and original pixel values. In step 1134, the value of the parameter diff may be clamped based on the value of combined_limit to determine HBNR_diff. After step 1134, the process may proceed to end step 1136.

In an embodiment of the invention, a machine-readable storage having stored thereon, a computer program having at least one code section for image processing, the at least one code section being executable by a machine for causing the machine to perform steps for block noise reduction in MPEG-coded video images as describe herein.

The approach described herein may provide an effective and simplified solution that may be implemented to reduce the presence of block noise artifacts without any perceptible degradation in video quality.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for image processing, the method comprising:
performing by one or more processors and/or circuits within a video processing device:
determining edge parameters for a current vertical edge, a left vertical edge, and a right vertical edge, wherein said current vertical edge, said left vertical edge, and said right vertical edge are associated with a selected image block and a neighboring image block right or left of said selected image block;
filtering at least one pixel to the left and at least one pixel to the right of said current vertical edge in a current row of pixels; and
limiting a value of at least a portion of said filtered at least one pixel to the left and at least one pixel to the right of said current vertical edge in said current row of pixels based on said determined edge parameters for said current vertical edge, said left vertical edge, and said right vertical edge.

2. The method according to claim 1, comprising determining a vertical combined clamping limit for said current vertical edge based on a left vertical edge clamping limit, a current vertical edge clamping limit, a right vertical edge clamping limit, and a block core limit.

3. The method according to claim 2, comprising determining said current vertical edge clamping limit based on a vertical edge variance parameter, a relative weight parameter, a background variance parameter, said block core limit, and a vertical maximum parameter.

4. The method according to claim 3, comprising determining said vertical maximum parameter by taking a maximum of at least one absolute difference between pixels to the left of said current vertical edge and corresponding pixels to the right of said current vertical edge.

5. The method according to claim 3, comprising determining said vertical variance parameter by adding at least one absolute difference between pixels to the left of said current vertical edge and corresponding pixels to the right of said current vertical edge.

6. The method according to claim 3, comprising determining said background parameter by taking a maximum of a left vertical variance parameter and a right vertical variance parameter.

7. The method according to claim 1, comprising determining a difference parameter for said current vertical edge based on said filtered at least one pixel to the left of said current vertical edge and said filtered at least one pixel to the right of said current vertical edge.

8. The method according to claim 7, comprising determining a vertical block noise reduction difference parameter based on said determined difference parameter and a vertical combined clamping limit.

9. A method for image processing, the method comprising:
performing by one or more processors and/or circuits within a video processing device:
determining edge parameters for a current horizontal edge and at least one vertical edge in a selected image block;
filtering at least one pixel on a current row of pixels adjacent to said current horizontal edge; and
limiting a value of at least a portion of said filtered at least one pixel on said current row adjacent to said current horizontal edge based on said determined edge parameters, wherein said limiting comprises applying scaling based weighing adjustment.

10. The method according to claim 9, comprising determining a horizontal combined clamping limit for said current horizontal edge based on a current vertical edge clamping limit, a left vertical edge clamping limit, and a current horizontal edge clamping limit.

11. The method according to claim 9, comprising determining a difference parameter based on said filtered at least one pixel on said current row adjacent to said current horizontal edge.

12. The method according to claim 11, comprising determining a horizontal block noise reduction difference parameter based on said determined difference parameter and a horizontal combined clamping limit.

13. The method according to claim 9, wherein said current row of pixels corresponds to a top row of pixels in said selected image block for a top field in interlaced video.

14. The method according to claim 9, wherein said current row of pixels corresponds to a bottom row of pixels in said selected image block for a bottom field in interlaced video.

15. A system for image processing, the system comprising:
one or more circuits that are operable to determine edge parameters for a current vertical edge, a left vertical edge, and a right vertical edge, wherein said current vertical edge, said left vertical edge, and said right vertical edge are associated with a selected image block and a neighboring image block right or left of said selected image block;
said one or more circuits are operable to filter at least one pixel to the left and at least one pixel to the right of said current vertical edge in a current row of pixels; and
said one or more circuits are operable to limit a value of at least a portion of said filtered at least one pixel to the left and at least one pixel to the right of said current vertical edge in said current row of pixels based on said determined edge parameters for said current vertical edge, said left vertical edge, and said right vertical edge.

16. The system according to claim 15, wherein said one or more circuits are operable to determine a vertical combined clamping limit for said current vertical edge based on a left vertical edge clamping limit, a current vertical edge clamping limit, a right vertical edge clamping limit, and a block core limit.

17. The system according to claim 16, wherein said one or more circuits are operable to determine said current vertical edge clamping limit based on a vertical variance parameter, a relative weight parameter, a background variance parameter, said block core limit, and a vertical maximum parameter.

18. The system according to claim 17, wherein said one or more circuits are operable to determine said vertical maximum parameter by taking a maximum of at least one absolute difference between pixels to the left of said current vertical edge and corresponding pixels to the right of said current vertical edge.

19. The system according to claim 17, wherein said one or more circuits are operable to determine said vertical variance parameter by adding at least one absolute difference between pixels to the left of said current vertical edge and corresponding pixels to the right of said current vertical edge.

20. The system according to claim 17, wherein said one or more circuits are operable to determine said background parameter by taking a maximum of a left vertical variance parameter and a right vertical variance parameter.

21. The system according to claim 15, wherein said one or more circuits are operable to determine a difference parameter for said current vertical edge based on said filtered at least one pixel to the left of said current vertical edge and said filtered at least one pixel to the right of said current vertical edge.

22. The system according to claim 21, wherein said one or more circuits are operable to determine a vertical block noise reduction difference parameter based on said determined difference parameter and a vertical combined clamping limit.

23. A system for image processing, the system comprising:
one or more circuits that are operable to determine edge parameters for a current horizontal edge and at least one vertical edge in a selected image block;
said one or more circuits are operable to filter at least one pixel on a current row of pixels adjacent to said current horizontal edge; and
said one or more circuits are operable to limit a value of at least a portion of said filtered at least one pixel on said current row adjacent to said current horizontal edge based on said determined edge parameters, wherein said limiting comprises applying scaling based weighing adjustment.

24. The system according to claim 23, wherein said one or more circuits are operable to determine a horizontal combined clamping limit for said current horizontal edge based on a current vertical edge clamping limit, a left vertical edge clamping limit, and a current horizontal edge clamping limit.

25. The system according to claim 23, wherein said one or more circuits are operable to determine a difference parameter based on said filtered at least one pixel on said current row adjacent to said current horizontal edge.

26. The system according to claim 25, wherein said one or more circuits are operable to determine a horizontal block noise reduction difference parameter based on said determined difference parameter and a horizontal combined clamping limit.

27. The system according to claim 23, wherein said current row of pixels corresponds to a top row of pixels in said selected image block for a top field in interlaced video.

28. The system according to claim 23, wherein said current row of pixels corresponds to a bottom row of pixels in said selected image block for a bottom field in interlaced video.

* * * * *